United States Patent
Zeng et al.

(10) Patent No.: US 11,664,635 B2
(45) Date of Patent: May 30, 2023

(54) TIME AND FREQUENCY METHOD AND SYSTEM FOR OPTICAL COMB

(71) Applicants: Chongqing Institute of East China Normal University, Chongqing (CN); ROI Optoelectronics Technology CO, LTD., Shanghai (CN); East China Normal University, Shanghai (CN)

(72) Inventors: Heping Zeng, Chongqing (CN); Xiuqi Wu, Chongqing (CN); Shuang Li, Chongqing (CN); Xuling Shen, Chongqing (CN)

(73) Assignees: CHONGQING INSTITUTE OF EAST CHINA NORMAL UNIVERSITY, Chongqing (CN); ROI OPTOELECTRONICS TECHNOLOGY CO, LTD., Shanghai (CN); EAST CHINA NORMAL UNIVERSITY, Shanghai (CN)

( * ) Notice: Subject to any disclaimer, the term of this patent is extended or adjusted under 35 U.S.C. 154(b) by 157 days.

(21) Appl. No.: 17/113,041

(22) Filed: Dec. 5, 2020

(65) Prior Publication Data
US 2021/0175678 A1 Jun. 10, 2021

(30) Foreign Application Priority Data
Dec. 6, 2019 (CN) .......................... 201911244247.7

(51) Int. Cl.
*H01S 3/13* (2006.01)
*H01S 3/00* (2006.01)
(Continued)

(52) U.S. Cl.
CPC .......... *H01S 3/0057* (2013.01); *H01S 3/1106* (2013.01); *H01S 3/1305* (2013.01); *H01S 3/1307* (2013.01); *H01S 3/1312* (2013.01)

(58) Field of Classification Search
CPC .... H01S 3/0057; H01S 3/1106; H01S 3/1305; H01S 3/1307; H01S 3/1312
See application file for complete search history.

(56) References Cited

U.S. PATENT DOCUMENTS

2008/0074660 A1* 3/2008 Ye .................. G01N 21/359
356/454
2018/0351321 A1* 12/2018 Pino .................. G02B 27/30

FOREIGN PATENT DOCUMENTS

CN  102349205   2/2012
CN  103904546 * 7/2014
(Continued)

OTHER PUBLICATIONS

SIPO, First Office Action for CN Application 201911244247.7, dated Sep. 4, 2020.
(Continued)

*Primary Examiner* — Michael Carter
(74) *Attorney, Agent, or Firm* — Hodgson Russ LLP (57) ABSTRACT

Provided are a time and frequency control method and system for optical comb. The method includes: controlling an optical comb measuring system to start and to generate an optical comb; obtaining monitoring data, wherein the monitoring data comprises a working temperature, a mode-locked frequency and a light pump power, wherein the mode-locked frequency comprises a repetition frequency and a carrier envelope phase locked at the end of starting the optical comb measuring system; determining whether an offset of the mode-locked frequency exceeds a self-feedback adjustment range of a hardware adjustment circuit; and in response to any of the repetition frequency and the carrier envelope phase exceeds the self-feedback adjustment range, adjusting the working temperature and the light pump power until the mode-locked frequency returns back into the self-feedback adjustment range.

10 Claims, 5 Drawing Sheets

(51) Int. Cl.
    *H01S 3/1106* (2023.01)
    *H01S 3/131* (2006.01)

(56) References Cited

FOREIGN PATENT DOCUMENTS

| CN | 203983724 | 12/2014 |
| CN | 105356935 | 2/2016 |
| CN | 109066278 | * 12/2018 |

OTHER PUBLICATIONS

Zhang et al., "Self-starting, long-term stable mode-locked femtosecond erbium-doped fiber laser source," Journal of Time and Frequency, Oct. 2015, vol. 38, No. 4, 9 pages.

* cited by examiner

TIME AND FREQUENCY METHOD AND SYSTEM FOR OPTICAL COMB

CROSS-REFERENCE TO RELATED APPLICATIONS

This application claims priority to Chinese Patent Application No. 201911244247.7, filed Dec. 6, 2019, the entire disclosure of which is incorporated herein by reference.

FIELD

The present disclosure relates to an automatic control technology field, and more particularly to a time and frequency control method and system for optical comb.

BACKGROUND

Optical frequency comb is a major breakthrough in the laser technology field. In frequency domain, the optical frequency comb behaves as an optical frequency sequence with equal frequency intervals, and in time domain, the optical frequency comb behaves as an electromagnetic field oscillation envelope with a time width of femtosecond magnitude. The spectral width of the optical frequency sequence has a Fourier transform relationship with the time width of the electromagnetic field oscillation envelope. Such distribution characteristics in frequency domain and time domain seem like the comb, and thus the ultrashort pulse having such distribution characteristics is called as the optical frequency comb, or optical comb for short. The optical comb is effective for absolute optical frequency measurement, and is widely used in a variety of applications.

SUMMARY

In a first aspect, embodiments of the present disclosure provide a time and frequency control method for optical comb. The method includes: controlling an optical comb measuring system to start and to generate an optical comb; obtaining monitoring data, wherein the monitoring data comprises a working temperature, a mode-locked frequency and a light pump power, wherein the mode-locked frequency comprises a repetition frequency and a carrier envelope phase locked at the end of starting the optical comb measuring system; determining whether an offset of the mode-locked frequency exceeds a self-feedback adjustment range of a hardware adjustment circuit; and in response to any of the repetition frequency and the carrier envelope phase exceeds the self-feedback adjustment range, adjusting the working temperature and the light pump power until the mode-locked frequency returns back into the self-feedback adjustment range.

In a second aspect, a time and frequency control system for optical comb is provided. The system includes an optical comb measuring system and an upper computer. The optical comb measuring system is configured to generate an optical comb. The upper computer is configured to perform a time and frequency control method for optical comb based on the first aspect.

EMBODIMENTS OF THE PRESENT DISCLOSURE

The present disclosure will be further described in detail below with reference to the accompanying drawings and embodiments. Same or similar reference numbers throughout the specification indicate same or similar elements or element having same or similar functions. It should be understood that the specific embodiments described herein are only used to explain the present disclosure, and should not be understood as limitation to the present disclosure.

During use, optical comb is susceptible to environment factors, such as environment temperature and vibration, such that a repetition frequency and a carrier envelope phase of the optical comb is not stable. In order to overcome the problem of unstable frequency, a hardware adjustment circuit is typically used for feedback adjustment. However, a self-feedback adjustment range of the hardware adjustment circuit has a relatively small magnitude, which is generally on the order of 100 mHz-1 mHz or Hz. For the offset of higher magnitude, the hardware adjustment circuit is unable to adjust it, resulting in the reduction of measuring accuracy of the optical comb measuring system. In the following, a time and frequency control method and system for optical comb according to embodiments of the present disclosure will be described in detail with reference to drawings.

The method includes: controlling an optical comb measuring system to start and to generate an optical comb; obtaining monitoring data, wherein the monitoring data comprises a working temperature, a mode-locked frequency and a light pump power, wherein the mode-locked frequency comprises a repetition frequency and a carrier envelope phase locked at the end of starting the optical comb measuring system; determining whether an offset of the mode-locked frequency exceeds a self-feedback adjustment range of a hardware adjustment circuit; and in response to any of the repetition frequency and the carrier envelope phase exceeds the self-feedback adjustment range, adjusting the working temperature and the light pump power until the mode-locked frequency returns back into the self-feedback adjustment range.

Figure 1:
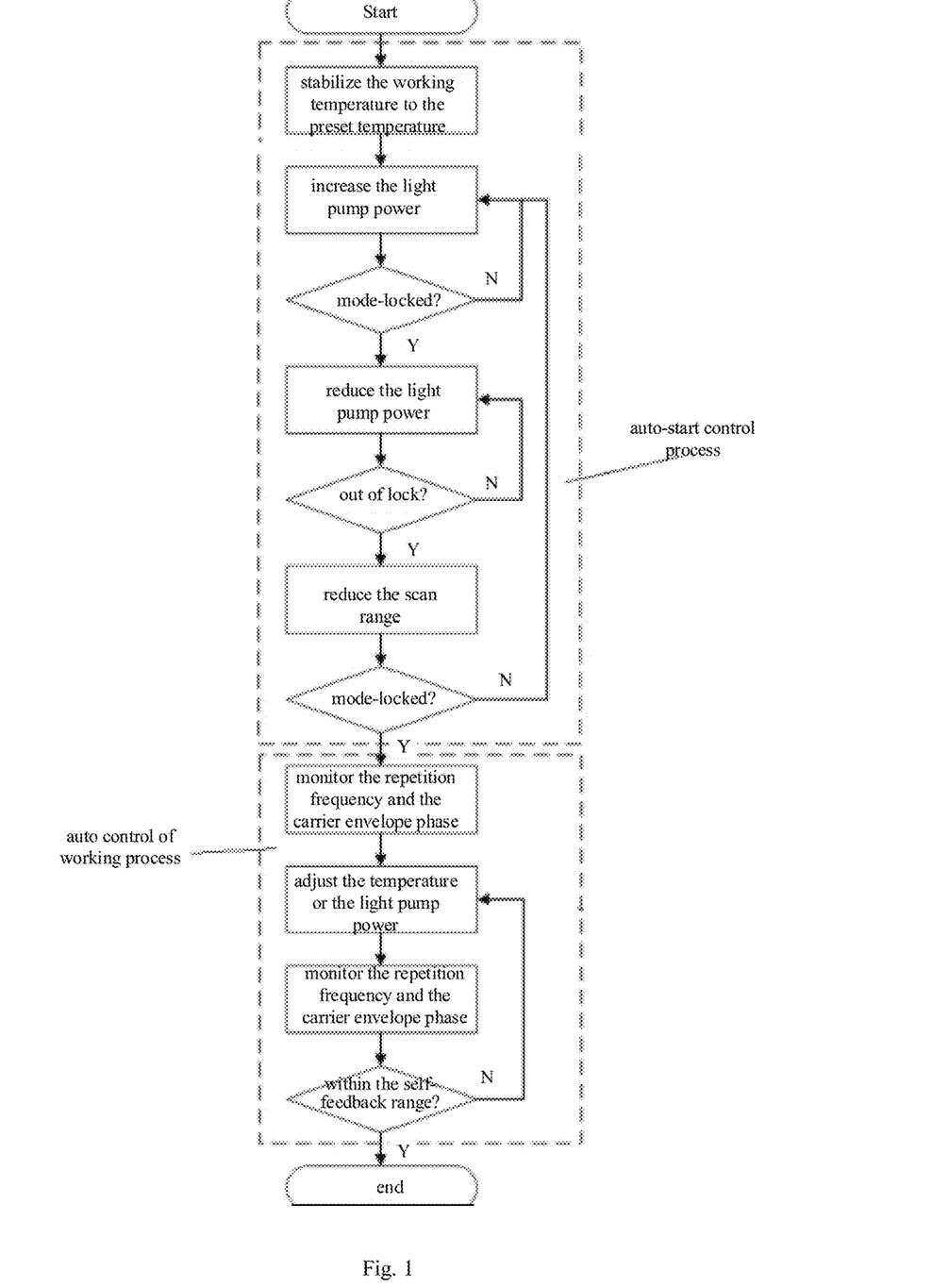
FIG. 1 is a schematic diagram illustrating a time and frequency control method for optical comb according to an embodiment of the present disclosure.

FIG. 1 illustrates a general flow of the method. As illustrated in FIG. 1, the optical comb measuring system is first started. The optical comb measuring system may be started manually or may be started using an auto-start program according to embodiments of the present disclosure.

First, the working temperature is stabilized to a preset temperature. Then, the light pump power is raised, until the repetition frequency and the carrier envelope phase occur and the optical comb is mode locked. Next, the light pump power is lowered until the optical comb is out of lock. Thereafter, the light pump power is raised and lowered alternately with gradually reducing the light pump power scan range, so that the mode locking and the out-of-lock occur alternately. With multiple scans, the minimum light pump power enabling the mode locking is obtained, and the repetition frequency and the carrier envelope phase corresponding to the minimum light pump power are locked.

When the offset of the repetition frequency exceeds the self-feedback adjustment range, the working temperature is adjusted. When the offset of the carrier envelope phase exceeds the self-feedback adjustment range, the working temperature or the light pump power is adjusted.

Embodiments of the present disclosure further provide a time and frequency control system for optical comb. The system includes an optical comb measuring system and an upper computer. The upper computer is provided with a time and frequency control program for optical comb. The time and frequency control program for optical comb is configured to execute the method described above.

Figure 2:
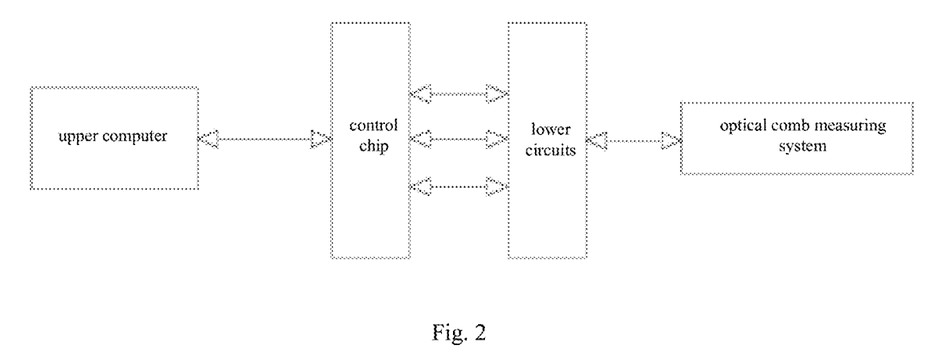
FIG. 2 is a schematic diagram of a time and frequency control system for optical comb according to an embodiment of the present disclosure.
Figure 3:
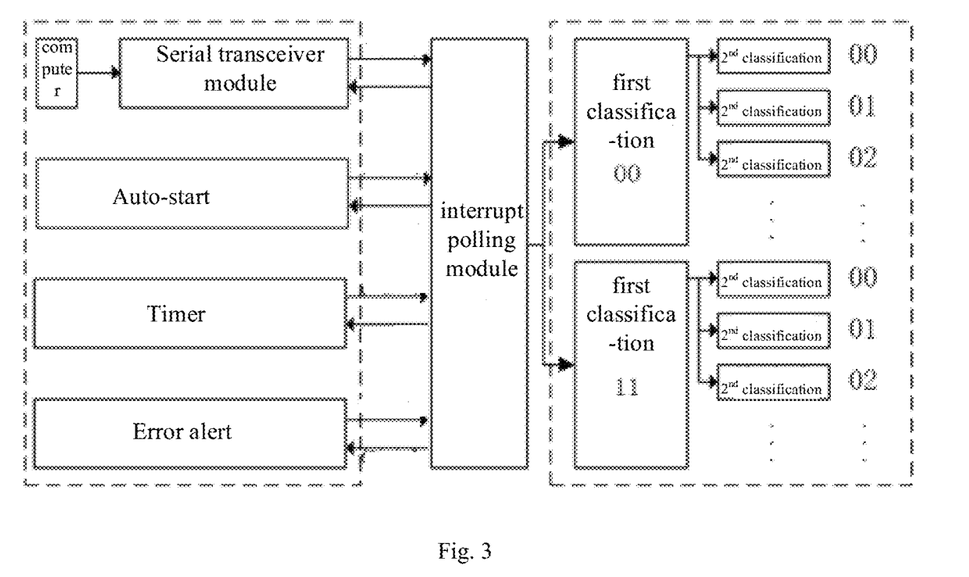
FIG. 3 is a schematic diagram illustrating a principle of a parallel communication system in a control chip.

As illustrated in FIG. 2 and FIG. 3, the system further includes a control chip coupled to the upper computer. The control chip may be implemented with FPGA or CPLD, which both support parallel communication. The control chip is configured to be connected to lower circuits. The lower circuits are configured to collect the monitoring data of the optical comb measuring system and to adjust the working temperature or the light pump power of the optical comb measuring system. The control chip is provided with a parallel communication system.

The parallel communication system includes superior modules, lower modules and an interrupt polling module. The superior modules include a serial transceiver module configured to be connected to the upper computer. The lower modules include a data cache module and an interface module configured to be connected to the lower circuits.

The interrupt pooling module is provided with an instruction cache module and a working signal monitoring module. The instruction cache module is configured to store working instructions from the superior modules into the data cache module. The working signal monitoring module is configured to store refreshed working data of the lower circuits into the data cache module via the interface module.

The superior modules further include an auto-start module, a time counting module and an error alert module. The auto-start module is configured to receive an auto-start request from the optical comb measuring system, and to control the optical comb measuring system to start automatically. The time counting module is configured to record a working time of the lower module. The error alert module is configured to monitor a working state of the lower module, and to issue a warning in response to an abnormality.

Figure 4:
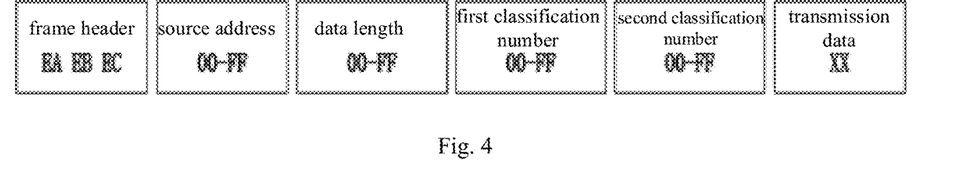
FIG. 4 is a schematic diagram of a frame format of a communication protocol.

As illustrated in FIG. 4, the communication between the superior modules and the lower modules follows the communication protocol as follows. The protocol frame includes a transmission frame header, a source address, a data length, a first classification number, a second classification number and transmission data from beginning to end.

The transmission frame header is configured for determining a starting location of the protocol frame and whether the protocol frame is valid.

The source address is one of addresses of the superior modules, each of the superior modules has a unique address.

The data length is configured for indicating a length of following data.

The first classification number is configured to distinguish a read operation and a write operation. The write operation comprises driving the lower modules to work via the interface module and storing the working data into the data cache module. The read operation comprises reading the working data or working instructions from the data cache module.

The transmission data comprises content of the working instruction or content of the working data.

Figure 5:
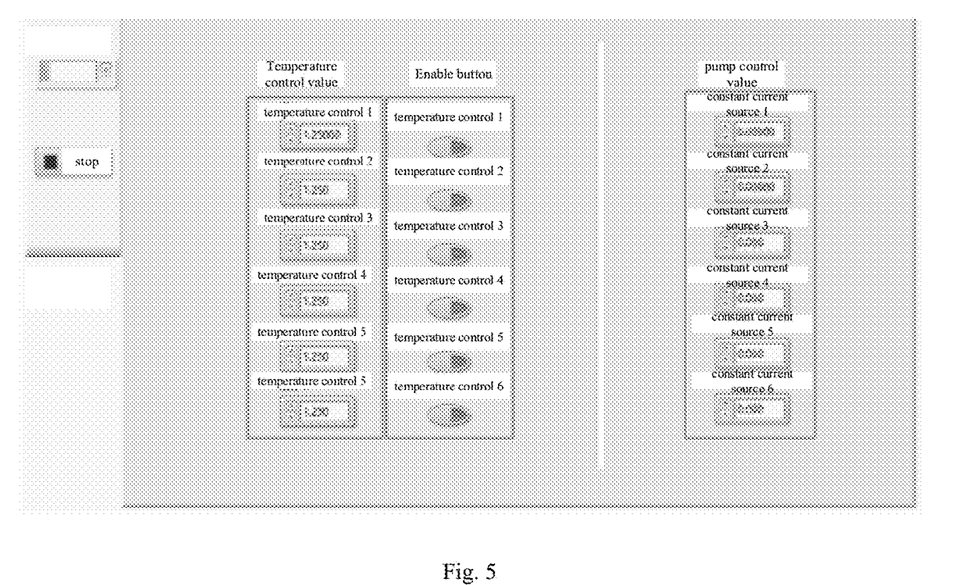
FIG. 5 is a schematic diagram of an operation interface of an upper machine.

As illustrated in FIG. 5, the upper computer is provided with an operation interface for human-machine interaction. The operation interface includes a light pump control panel, a temperature control panel, a locking signal monitoring panel and an optical comb parameter setting panel.

Both the self-auto module and the upper computer may control the optical comb measuring system to start automatically based on the auto-start program of the present disclosure. The auto-start module is connected with an auto-start button, which may enable one-button start. The upper computer may implement the manual start via the operation interface, or may implement the automatic start. The difference between the automatic start and the manual start of the upper computer lies in that, under the automatic start, the preset working temperature may be adjusted, however, under the manual start, the preset working temperature has been determined in advance and may not be adjusted.

Figure 6:
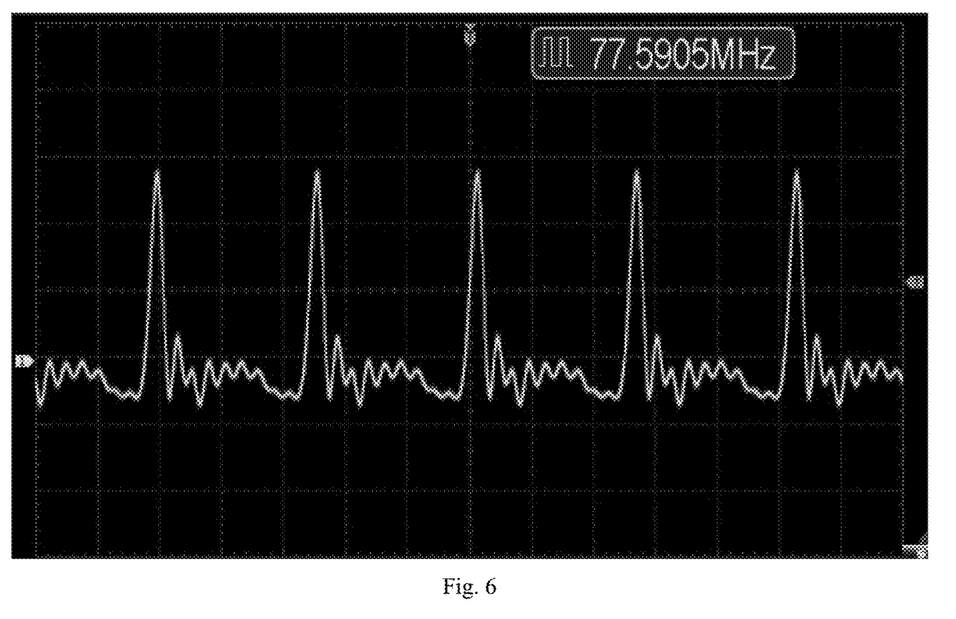
FIG. 6 is a schematic diagram of locking a repetition frequency.
Figure 7:
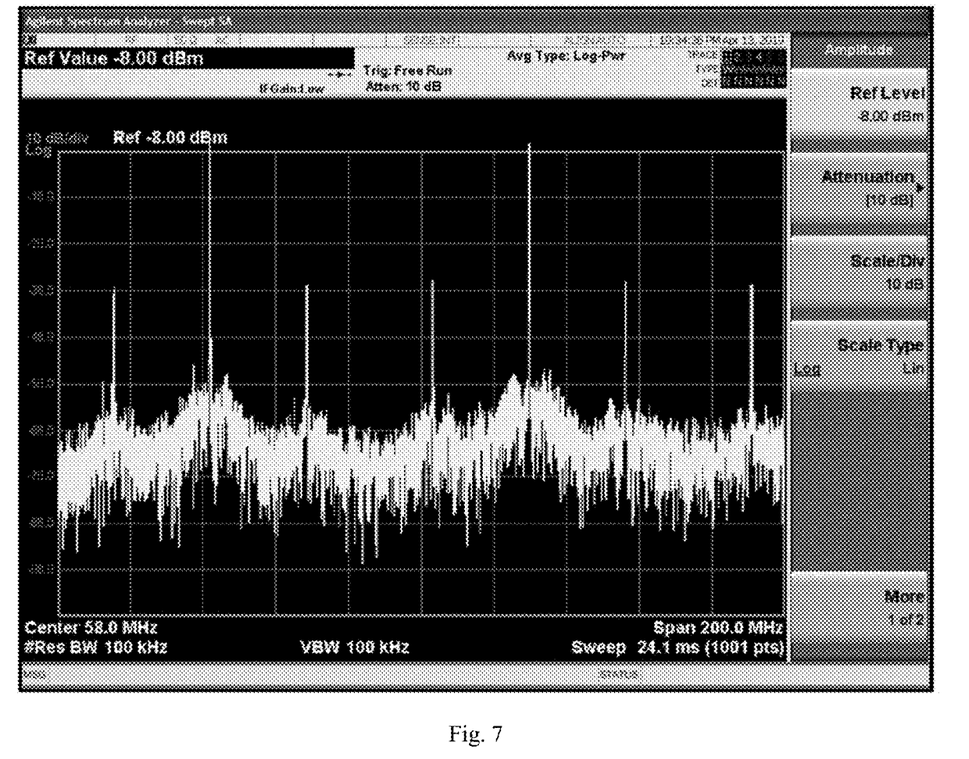
FIG. 7 is a schematic diagram of locking a carrier envelope phase.
Figure 8:
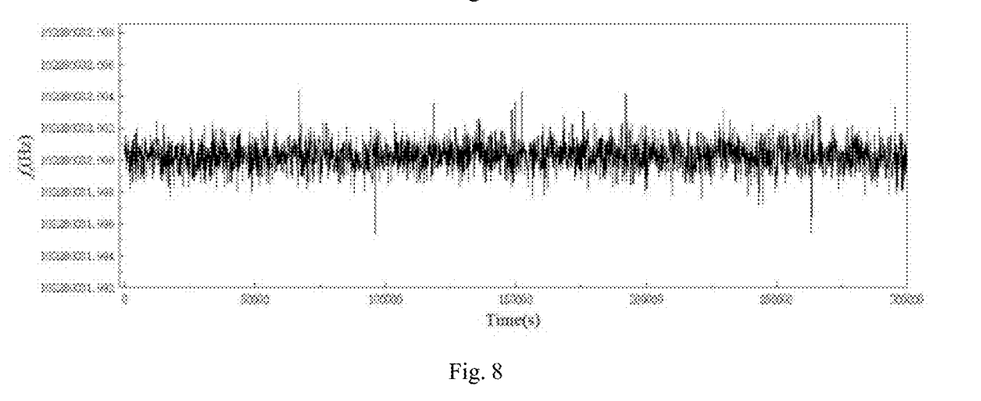
FIG. 8 is a schematic diagram of a stabilized mode-locked frequency in a field environment.

The effectiveness of stabilizing the mode-locked frequency by the control system of the present disclosure is illustrated in FIGS. 6-8. The effectiveness of locking the repetition frequency is illustrated in FIG. 6. The effectiveness of locking the carrier envelope phase is illustrated in FIG. 7. The stabilized 77.59 MHz mode-locked laser signal is generated, while the carrier envelope phase signal is locked. The optical comb signal is collected for 24 hours, the jitter of which, as illustrated in FIG. 8, is in the mHz order.

The lower circuits include a temperature monitoring circuit, a temperature control circuit, a light pump monitoring circuit, a light pump control circuit, a phase lock circuit, and a frequency monitoring circuit. The interface module includes an underlying drive module connected to the lower circuits respectively.

The interrupt polling module is configured to parse the working instructions stored in the data cache module based on priorities of the superior modules. The data cache module is configured to store the working data based on priorities of the lower modules. The serial transceiver module has the highest priority. The priorities are as follows.

| Module name | Superior/lower | Priority (the smaller the number, the higher the priority) |
| --- | --- | --- |
| Serial transceiver module | superior | 1 |
| Self-auto module | superior | 2 |
| Time counting module | superior | 3 |
| Error alert module | superior | 4 |
| Underlying drive module | lower | 1 |
| Data cache module | lower | 2 |

In the following, the write operation and the read operation will be described.

Figure 9:
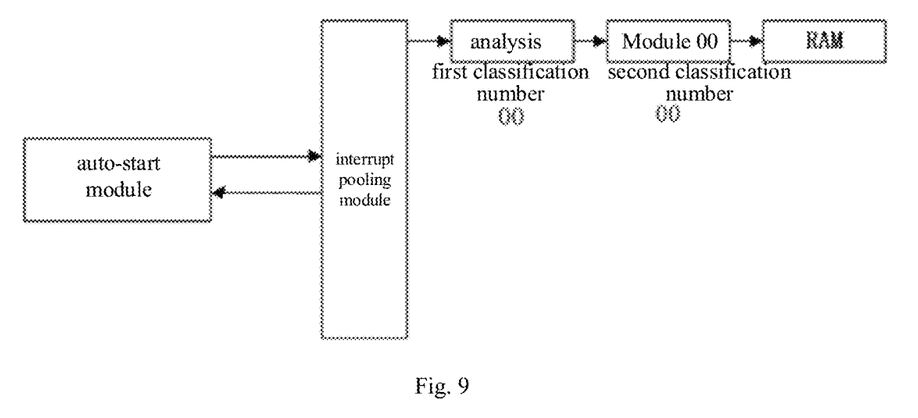
FIG. 9 is a schematic diagram of a process of a superior module sending instructions.

As illustrated in FIG. 9, the auto-start module controlling a constant current source driver to increase the pump light is an example of the write operation. The first classification number is 00, the corresponding second classification number is 00, and the frame sent by the auto-start module is:

| frame header | source address | data length | first classification number | second classification number | data |
|---|---|---|---|---|---|
| AA | 11 | 05 | 00 | 00 | XXXXXX |

After receiving the data frame sent by the auto-start module, the corresponding analysis module first stores this instruction, and determines whether the instruction is valid, and discards the frame if the transmission is not correct due to noise affecting the frame header. In the case that the data frame is correct, the data frame is sent to the correct lower drive module, and the lower drive module automatically stores the working information into the data cache module after working, and prepares for the read operation of the lower module.

In this example, one full process of sending the instruction is completed. The instruction is generated by the logical internal module, sent by the auto-start module, sent to the analysis module via the interrupt polling module, and finally drives the constant current source driver in the lower module.

Figure 10:
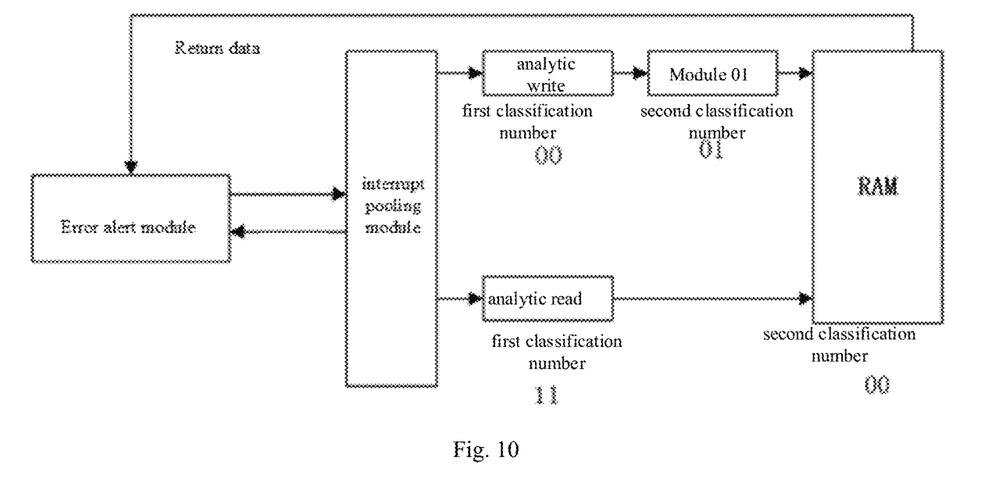
FIG. 10 is a schematic diagram of a process of a superior module receiving instructions.

The superior error alert module needs to obtain the current working information of the optical comb measuring system. Obtaining the information is a read operation, and the first classification number of which is 11, as illustrated in FIG. 10. In order to read information, it needs to first drive the lower read module to read from the cache, and sends the instruction to read from the data cache module, which needs to send the instructions twice. In detail, the data is transmitted and analyzed by respective modules as follows.

The error alert module first triggers the lower module responsible for reading data. The sending frame is:

| frame header | source address | data length | first classification number | second classification number | data |
|---|---|---|---|---|---|
| AA | 14 | 03 | 11 | 01 | XX |

After receiving the data frame sent by the auto-start module, the corresponding analysis module first stores this instruction, and determines whether the instruction is valid, and discards the data frame if the transmission is not correct due to noise affecting the frame header. In the case that the data frame is correct, the data frame is sent to the correct lower module, and the lower module reads the corresponding data for storing into the data cache module and waiting for reading.

After the lower module completes the storing, the error alert module performs the reading. The sending frame is:

| frame header | source address | data length | first classification number | second classification number | data |
|---|---|---|---|---|---|
| AA | 14 | 03 | 11 | 00 | 01 |

The analysis module corresponding to the first classification number 11 receives the data from the data cache module corresponding to the second classification number 00.

In this example, one full process of sending the instruction and reading data is completed. The instruction is generated by the logical internal module. The reading data comprises sending a first instruction by the error alert module, driving the lower module to read and store data, and getting the stored data based on a second instruction.

Figure 11:
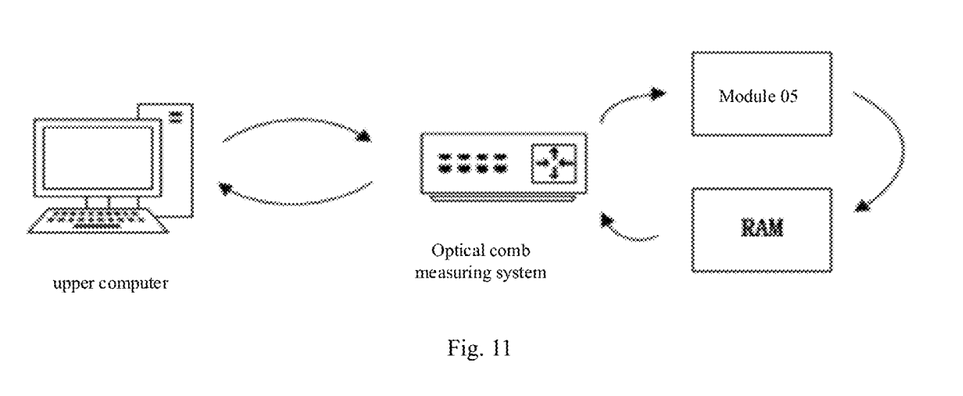
FIG. 11 is a schematic diagram of communication between an upper computer and an optical comb.

Embodiments of the present disclosure further provide another example of read operation. In the case that the upper computer needs to obtain the working information of the optical comb measuring system, besides that the lower module receives the instruction, the optical comb measuring system needs to generate the instruction by itself internally and return the data to the upper computer. As illustrated in FIG. 11, the upper computer sends the instruction to the module 05, the module 05 reads the information and waits for the read instruction, and returns the corresponding data after receiving the read instruction. In detail, respective modules send and analyze data as follows.

The data frame sent by the upper computer to the module 05 for data reading is:

| frame header | source address | data length | first classification number | second classification number | data |
|---|---|---|---|---|---|
| AA | 12 | 03 | 00 | 05 | XX |

The data frame sent by the upper computer to the optical comb measuring module for requesting to return the data of the module 05 is:

| frame header | source address | data length | first classification number | second classification number | data |
|---|---|---|---|---|---|
| AA | 12 | 03 | 11 | 00 | 05 |

After receiving the data frame sent by the upper computer, the module 05 works and stores the data into the data cache module. Therefore, in the second read, the second classification number 00 is corresponding to the data cache module, and the address 05 of the data cache module (RAM) is corresponding to the module 05, and thus the data is 05.

The data frame sent by the optical comb measuring module to the upper computer is:

| frame header | source address | data length | first classification number | second classification number | data |
|---|---|---|---|---|---|
| AA | 12 | 06 | 11 | 00 | 05XXXXXX |

After receiving the returned data, the upper computer first determines whether the frame header and the source address are correct, records the instruction based on the data length, and records the data based on the first classification number and the second classification number, finally forming the table and the image.

In this example, the control on the optical comb measuring system from the external signal is completed, which together with the auto control of the optical comb measuring system, enables the normal working of the optical comb measuring system.

Although explanatory embodiments have been shown and described, it would be understood that above embodiments are exemplary, and shall not be understood as limitation to the present disclosure, and it would be appreciated by those skilled in the art that changes, alternatives, and modifications may be made in the embodiments within the scope of the disclosure.

What is claimed is:

1. A time and frequency control method for optical comb, comprising:
controlling an optical comb measuring system to start and to generate an optical comb;
obtaining monitoring data, wherein the monitoring data comprises a working temperature, a mode-locked frequency and a light pump power, wherein the mode-locked frequency comprises a repetition frequency and a carrier envelope phase locked at the end of starting the optical comb measuring system;
determining whether an offset of the mode-locked frequency exceeds a self-feedback adjustment range of a hardware adjustment circuit; and
in response to any of the repetition frequency and the carrier envelope phase exceeds the self-feedback adjustment range, adjusting the working temperature and the light pump power until the mode-locked frequency returns back into the self-feedback adjustment range,
wherein controlling the optical comb measuring system to start and to generate the optical comb comprises:
stabilizing the working temperature to a preset temperature;
raising the light pump power until the repetition frequency and the carrier envelope phase occur and the optical comb is mode locked;
lowering the light pump power until the optical comb is out of lock; and
alternating the raising and the lowering with gradually reduced light pump power scan range, so that the mode locking and the out-of-lock occur alternately, to obtain a minimum light pump power enabling the mode locking, and lock the repetition frequency and the carrier envelope phase corresponding to the minimum light pump power.

2. The method of claim 1, wherein:
the working temperature is adjusted in response to the offset of the repetition frequency exceeds the self-feedback adjustment range; and
the working temperature or the light pump power is adjusted in response to the offset of the carrier envelope phase exceeds the self-feedback adjustment range.

3. A time and frequency control system for optical comb, comprising:
an optical comb measuring system, configured to generate an optical comb;
an upper computer, configured to:
control the optical comb measuring system to start and to generate the optical comb;
obtain monitoring data, wherein the monitoring data comprises a working temperature, a mode-locked frequency and a light pump power, wherein the mode-locked frequency comprises a repetition frequency and a carrier envelope phase locked at the end of starting the optical comb measuring system;
determine whether an offset of the mode-locked frequency exceeds a self-feedback adjustment range of a hardware adjustment circuit; and
in response to any of the repetition frequency and the carrier envelope phase exceeds the self-feedback adjustment range, adjust the working temperature and the light pump power until the mode-locked frequency returns back into the self-feedback adjustment range; and
a control chip, coupled to the upper computer, wherein the control chip is configured to be connected to lower circuits, and is provided with a parallel communication system.

4. The system of claim 3, wherein the parallel communication system comprises:
superior modules, comprising a serial transceiver module configured to be coupled to the upper computer;
lower modules, comprising a data cache module and an interface module configured to be connected to the lower circuits; and
an interrupt polling module, provided with an instruction cache module and a working signal monitoring module, wherein the instruction cache module is configured to store working instructions from the superior modules into the data cache module, the working signal monitoring module is configured to store refreshed working data of the lower circuits into the data cache module via the interface module;
wherein the superior modules are configured to perform bidirectional parallel communication with the lower modules via the interrupt polling module.

5. The system of claim 4, wherein the superior modules further comprise:
an auto-start module, configured to receive an auto-start request from the optical comb measuring system, and to control the optical comb measuring system to start automatically;
a time counting module, configured to record a working time of the lower module; and
an error alert module, configured to monitor a working state of the lower module, and to issue a warning in response to an abnormality.

6. The system of claim 4, wherein the interrupt polling modules is configured to parse the working instructions stored in the data cache module based on priorities of the superior modules;
wherein the data cache module is configured to store the working data based on priorities of the lower modules; and
wherein the serial transceiver module has the highest priority.

7. The system of claim 4, wherein a protocol frame used in the bidirectional parallel communication comprises a transmission frame header, a source address, a data length, a first classification number, a second classification number and transmission data from beginning to end, in which:
the transmission frame header is configured for determining a starting location of the protocol frame and whether the protocol frame is valid;
the source address is one of addresses of the superior modules, each of the superior modules has a unique address;
the data length is configured for indicating a length of following data;
the first classification number is configured to distinguish a read operation and a write operation, the write operation comprises driving the lower modules to work via the interface module and storing the working data into the data cache module, the read operation comprises reading the working data or working instructions from the data cache module;

the second classification number is configured to distinguish respective lower modules, each of the lower modules has a unique classification number; and the transmission data comprises content of the working instruction or content of the working data.

8. The system of claim 3, wherein the control chip is implemented with FPGA or CPLD, and the upper computer is provided with an operation interface for human-machine interaction.

9. The system of claim 8, wherein the operation interface comprises a light pump control panel, a temperature control panel, a locking signal monitoring panel and an optical comb parameter setting panel.

10. The system of claim 3, wherein the lower circuits comprise a temperature monitoring circuit, a temperature control circuit, a light pump monitoring circuit, a light pump control circuit, a phase lock circuit, and a frequency monitoring circuit, and the interface module comprises an underlying drive module connected to the lower circuits respectively.

* * * * *